United States Patent
Martin et al.

(10) Patent No.: US 10,322,960 B2
(45) Date of Patent: Jun. 18, 2019

(54) CONTROLLING FOAM IN APPARATUS DOWNSTREAM OF A MELTER BY ADJUSTMENT OF ALKALI OXIDE CONTENT IN THE MELTER

(71) Applicant: JOHNS MANVILLE, Denver, CO (US)

(72) Inventors: Marlon Keith Martin, Etowah, TN (US); Kristina Jevicova, Riceville, TN (US); Jeffrey M Shock, Castle Rock, CO (US); Mark William Charbonneau, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/875,439

(22) Filed: Oct. 5, 2015

(65) Prior Publication Data

US 2017/0096358 A1    Apr. 6, 2017

(51) Int. Cl.
*C03B 5/225* (2006.01)
*C03B 5/235* (2006.01)
(Continued)

(52) U.S. Cl.
CPC .............. *C03B 5/173* (2013.01); *C03B 3/00* (2013.01); *C03B 5/2356* (2013.01); *C03B 5/24* (2013.01); *C03C 11/007* (2013.01)

(58) Field of Classification Search
CPC ................................ C03C 1/004; C03B 5/225
See application file for complete search history.

(56) References Cited

U.S. PATENT DOCUMENTS

| 1,579,353 A | 4/1926 | Good |
| 1,636,151 A | 7/1927 | Schofield |

(Continued)

FOREIGN PATENT DOCUMENTS

| DE | 36 29 965 A1 | 3/1988 |
| DE | 40 00 358 C2 | 3/1993 |

(Continued)

OTHER PUBLICATIONS

"Gamma Irradiators for Radiation Processing" Booklet, International Atomic Energy Agency, Vienna, Austria.
(Continued)

*Primary Examiner* — Erin Snelting
(74) *Attorney, Agent, or Firm* — Robert D. Touslee

(57) ABSTRACT

Controlling foam in apparatus downstream of a melter by adjustment of alkali oxide content in the melter. One method includes feeding a feedstock into a submerged combustion melter (SCM) apparatus having an internal space containing a flowing or non-flowing molten mass of foamed glass comprising molten glass and bubbles entrained therein, the molten mass having glass foam comprising glass foam bubbles on at least a portion of a top surface of the molten mass. The molten mass from the SCM is routed to a downstream apparatus, stability of the glass foam in the downstream apparatus is observed, and alkali oxide percentage fed to the SCM apparatus is adjusted based on the observation to positively or negatively affect the foam stability. Systems for carrying out the methods, and the products of the methods are also considered novel and inventive.

21 Claims, 7 Drawing Sheets

(51) Int. Cl.
 C03B 5/173 (2006.01)
 C03B 5/24 (2006.01)
 C03C 11/00 (2006.01)
 C03B 3/00 (2006.01)

(56) References Cited

U.S. PATENT DOCUMENTS

| | | |
|---|---|---|
| 1,679,295 A | 7/1928 | Dodge |
| 1,706,857 A | 3/1929 | Mathe |
| 1,716,433 A | 6/1929 | Ellis |
| 1,675,474 A | 9/1932 | McKinley |
| 1,883,023 A | 10/1932 | Slick |
| 1,937,321 A | 11/1933 | Howard |
| 1,944,855 A | 1/1934 | Wadman |
| 1,989,103 A | 1/1935 | McKelvey et al. |
| 2,042,560 A | 6/1936 | Stewart |
| 2,064,546 A | 12/1936 | Kutchka |
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,658,094 A | 11/1953 | Nonken |
| 2,677,003 A | 4/1954 | Arbeit et al. |
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,690,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Plumat et al. |
| 3,239,325 A | 3/1966 | Roberson et al. |
| 3,241,548 A | 3/1966 | See et al. |
| 3,245,769 A | 4/1966 | Eck et al. |
| 3,248,205 A | 4/1966 | Dolf et al. |
| 3,248,206 A | 4/1966 | Apple et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,375,095 A | 3/1968 | Poole |
| 3,380,463 A | 4/1968 | Trethewey |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,617,234 A | 11/1971 | Hawkins et al. |
| 3,627,504 A | 12/1971 | Johnson et al. |
| 3,632,335 A | 1/1972 | Worner |
| 3,692,017 A | 9/1972 | Glachant et al. |
| 3,717,139 A | 2/1973 | Guillet et al. |
| 3,738,792 A | 6/1973 | Feng |
| 3,741,656 A | 6/1973 | Shapiro |
| 3,741,742 A | 6/1973 | Jennings |
| 3,754,879 A | 6/1973 | Phaneuf |
| 3,746,527 A | 7/1973 | Knavish et al. |
| 3,747,588 A | 7/1973 | Malmin |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,565 A | 9/1975 | Burton et al. |
| 3,913,560 A | 10/1975 | Lazarre et al. |
| 3,929,445 A | 12/1975 | Zippe |
| 3,936,290 A | 2/1976 | Cerutti et al. |
| 3,951,635 A | 4/1976 | Rough |
| 3,976,464 A | 8/1976 | Wardiaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmulier |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest |
| 4,413,882 A | 11/1983 | Bailey et al. |
| 4,424,071 A | 1/1984 | Steitz et al. |
| 4,432,760 A | 2/1984 | Propster et al. |
| 4,455,762 A | 6/1984 | Saeman |
| 4,461,576 A | 7/1984 | King |
| 4,488,537 A | 12/1984 | Laurent |
| 4,508,970 A | 4/1985 | Ackerman |
| 4,539,034 A | 9/1985 | Hanneken |
| 4,542,106 A | 9/1985 | Sproull |
| 4,545,800 A | 10/1985 | Won et al. |
| 4,549,896 A | 10/1985 | Streicher et al. |
| 4,599,100 A | 7/1986 | Demarest |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,718,931 A | 1/1988 | Boettner |

(56) References Cited

U.S. PATENT DOCUMENTS

| | | |
|---|---|---|
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,794,860 A | 1/1989 | Welton |
| 4,798,616 A | 1/1989 | Knavish et al. |
| 4,812,372 A | 3/1989 | Kithany |
| 4,814,387 A | 3/1989 | Donat |
| 4,816,056 A | 3/1989 | Tsai et al. |
| 4,818,265 A | 4/1989 | Krumwiede et al. |
| 4,877,436 A | 10/1989 | Sheinkop |
| 4,877,449 A | 10/1989 | Khinkis |
| 4,878,829 A | 11/1989 | Anderson |
| 4,882,736 A | 11/1989 | Pieper |
| 4,886,539 A | 12/1989 | Gerutti et al. |
| 4,900,337 A | 2/1990 | Zortea et al. |
| 4,919,700 A | 4/1990 | Pecoraro et al. |
| 4,927,866 A | 5/1990 | Backderf et al. |
| 4,932,035 A | 6/1990 | Pieper |
| 4,953,376 A | 9/1990 | Merlone |
| 4,963,731 A | 10/1990 | King |
| 4,969,942 A | 11/1990 | Schwenninger et al. |
| 4,973,346 A | 11/1990 | Kobayashi |
| 5,011,086 A | 4/1991 | Sonnleitner et al. |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,194,747 A | 3/1993 | Culpepper et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,412,882 A | 5/1995 | Zippe et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Siavejkov et al. |
| 5,586,999 A | 12/1996 | Kobayashi |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursicri |
| 5,713,668 A | 2/1998 | Lunghofer et al. |
| 5,718,741 A | 2/1998 | Hull et al. |
| 5,724,901 A | 3/1998 | Guy et al. |
| 5,736,476 A | 4/1998 | Watzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Philippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,044,667 A | 4/2000 | Chenoweth |
| 6,045,353 A | 4/2000 | VonDrasek et al. |
| 6,068,468 A | 5/2000 | Philippe et al. |
| 6,071,116 A | 6/2000 | Philippe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | Vondrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novick |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,332,339 B1 | 12/2001 | Kawaguchi et al. |
| 6,338,337 B1 | 1/2002 | Panz et al. |
| 6,339,610 B1 | 1/2002 | Hoyer et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kuikarni et al. |
| 6,578,779 B2 | 6/2003 | Dion |
| 6,654,290 B2 | 11/2003 | Lee et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,701,751 B2 | 3/2004 | Arechaga et al. |
| 6,705,118 B2 | 3/2004 | Simpson et al. |
| 6,707,739 B2 | 3/2004 | Chen |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |

(56) References Cited

U.S. PATENT DOCUMENTS

| | | |
|---|---|---|
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 7,946,136 B2 | 5/2011 | Watkinson |
| 8,033,254 B2 | 10/2011 | Hannum et al. |
| 8,158,543 B2 * | 4/2012 | Dejneka ............... C03C 1/004 428/410 |
| 8,279,899 B2 | 10/2012 | Kitabayashi |
| 8,285,411 B2 | 10/2012 | Hull et al. |
| 8,402,787 B2 | 3/2013 | Pernode et al. |
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdahl |
| 2005/0236747 A1 | 10/2005 | Rue et al. |
| 2006/0000239 A1 | 1/2006 | Jeanvoine et al. |
| 2006/0101859 A1 | 5/2006 | Takagi et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0032368 A1 * | 2/2007 | Landa ............... C03C 1/004 501/72 |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0278404 A1 | 11/2008 | Blalock et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 | 7/2009 | Jacques et al. |
| 2009/0220899 A1 | 9/2009 | Spangelo et al. |
| 2009/0235695 A1 | 9/2009 | Pierrot et al. |
| 2009/0320525 A1 | 12/2009 | Johnson |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0033792 A1 | 2/2012 | Kulik et al. |
| 2012/0077135 A1 | 3/2012 | Charbonneau |
| 2012/0104306 A1 | 5/2012 | Kamiya et al. |
| 2012/0216576 A1 | 6/2012 | Boughton et al. |
| 2012/0216567 A1 | 8/2012 | Boughton et al. |
| 2012/0216568 A1 | 8/2012 | Fisher et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0123990 A1 | 5/2013 | Kulik et al. |
| 2013/0279532 A1 | 10/2013 | Ohmstede et al. |
| 2013/0283861 A1 | 10/2013 | Mobley et al. |
| 2013/0327092 A1 | 12/2013 | Charbonneau |
| 2014/0007623 A1 | 1/2014 | Charbonneau et al. |
| 2014/0090422 A1 | 4/2014 | Charbonneau et al. |
| 2014/0090423 A1 | 4/2014 | Charbonneau et al. |
| 2014/0090424 A1 | 4/2014 | Charbonneau et al. |
| 2014/0144185 A1 | 5/2014 | Shock et al. |
| 2014/0208800 A1 * | 7/2014 | McCann ............... C03B 5/2356 65/29.18 |

FOREIGN PATENT DOCUMENTS

| | | |
|---|---|---|
| DE | 44 24 814 A1 | 1/1996 |
| DE | 196 19 919 A1 | 8/1997 |
| DE | 100 29 983 A1 | 1/2002 |
| DE | 100 29 983 C2 | 9/2003 |
| DE | 10 2005 033330 B3 | 8/2006 |
| EP | 0 181 248 B1 | 10/1989 |
| EP | 1 337 789 S1 | 12/2004 |
| EP | 1 990 321 A1 | 11/2008 |
| EP | 2 133 315 A1 | 12/2009 |
| EP | 2 138 465 A2 | 12/2009 |
| EP | 1 986 966 B1 | 4/2010 |
| EP | 1 667 934 E1 | 2/2011 |

(56) References Cited

FOREIGN PATENT DOCUMENTS

| | | |
|---|---|---|
| EP | 2 397 446 A2 | 12/2011 |
| EP | 2 404 880 A1 | 1/2012 |
| EP | 2 433 911 A1 | 3/2012 |
| EP | 2 578 548 A2 | 4/2013 |
| FR | 2 740 860 A1 | 9/1997 |
| GB | 191301772 | 1/1914 |
| GB | 191407633 | 3/1914 |
| GB | 164073 A | 5/1921 |
| GB | 14875439 | 9/1976 |
| IT | 1208172 | 7/1989 |
| JP | S58 199728 A | 11/1983 |
| KR | 2000 0050572 A | 8/2000 |
| KR | 100465272 B1 | 12/2004 |
| RO | 114827 | 7/1999 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012048790 A1 | 4/2012 |
| WO | 2014055199 A1 | 4/2014 |

OTHER PUBLICATIONS

Furman, BJ, ME 120 Experimental Methods Vibration Measurement, San Jose University Department of Mechanical and Aerospace Engineering.

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Gerber, J., "Les Densimetres Industriels," Petro ie et Techniques, Association Francaise des Techniciens du Petrole, Jun. 1, 1989, pp. 26-27, No. 349, Paris, France.

Rue et al, "Submerged Combustion Melting of Glass," International Journal of Applied Glass Science, Nov. 9, 2011, pp. 262-274, vol. 2, No. 4.

National Laboratory, US DOE contract No. DE-AC09-085R22470, Oct. 2011.

"AccuTru Temperature Measurement," AccuTru International Corporation, 2003.

"Glass Technologies—The Legacy of a Successful Public-Private Partnership", 2007, U.S. Department of Energy, pp. 1-32.

"Glass Melting Technology—A Technical and Economic Assessment," 2004, U.S. Department of Energy, pp. 1-292.

Muijsenberg, H. P. H., Neff, G., Muller, J., Chrneiar, J., Bodi, R. and Matustikj, F. (2008) "An Advanced Control System to Increase Glass Quality and Glass Production Yields Based on GS ESLLI Technology", in A Collection of Papers Presented at the 66th Conference on Glass Problems: Ceramic Engineering and Science Proceedings, vol. 27, Issue 1 (ed W. M. Kriven), John Wiley & Sons, inc., Hoboken, NJ, USA. doi: 10.1002/9780470291306.ch3.

Rue, "Energy-Efficient Glass Melting—The Next Generation Metter", Gas Technology Institute, Project No. 20621 Final Report (2008).

Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.

Sims, Richard, "Batch charging technologies—a review", www.glassonweb.com, Nikolaus org Grnbh & Co KG (May 2011).

"Canty Process Technology" brochure, date unknown, copy received in Apr. 2012 at American Institute of Chemical Engineers, Spring Meeting, Houston, TX.

"Glass Melting", Battelle PNNL MST Handbook, U.S. Department of Energy, Pacific Northwest Laboratory, retrieved from the Internet Apr. 20, 2012.

"Roll Compaction", brochure from The Fitzpatrick Company, Elmhurst, Illinois, retrieved from the Internet Apr. 20, 2012.

"Glass industry of the Future", United States Department of Energy, report 02-0A50113-03, pp. 1-17, Sep. 30, 2008.

Stevenson, "Foam Engineering: Fundamentals and Applications", Chapter 16, pp. 336-389, John Wiley & Sons (Mar. 13, 2012).

Clare et al., "Density and Surface Tension of Borate Containing Silicate Melts", Glass Technology—European Journal of Glass Science and Technology, Part A, pp. 59-62, vol. 44, No. 2, Apr. 1, 2003.

Seward, T.P., "Modeling of Glass Making Processes for Improved Efficiency", DE-FG07-96EE41262, Final Report, Mar. 31, 2003.

Conradt et al, Foaming behavior on glass melts, Glastechniche Berichte 60 (1987) Nr. 6, S. 189-201 Abstract Fraunhofer ISC.

Kim et al., "Foaming in Glass Melts Produced by Sodium Sulfate Decomposition under Isothermal Conditions", Journal of the American Ceramic Society, 74(3), pp. 551-555, 1991.

Kim et al., "Foaming in Glass Melts Produced by Sodium Sulfate Decomposition under Ramp Heating Conditions", Journal of the American Ceramic Society, 75(11), pp. 2959-2963, 1992.

Kim et al., "Effect of Furnace Atmosphere on E-glass Foaming", Journal of Non-Crystalline Solids, 352(50/51), pp. 5287-5295, 2006.

Van Limpt et al., "Modelling the evaporation of boron species. Part 1. Alkali-free borosilicate glass melts", Glass Technology—European Journal of Glass Science and Technology, Part. A, 52(3): pp, 77-87, 2011.

Oblain, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

\* cited by examiner

CONTROLLING FOAM IN APPARATUS DOWNSTREAM OF A MELTER BY ADJUSTMENT OF ALKALI OXIDE CONTENT IN THE MELTER

CROSS-REFERENCE TO RELATED APPLICATIONS

This application may be related to the following United States non-provisional patent applications assigned to the Applicant of the present application which are all incorporated by reference herein: U.S. Ser. No. 12/817,754 filed Jun. 17, 2010, now U.S. Pat. No. 8,769,992 issued Jul. 8, 2014; U.S. Ser. No. 13/267,990 filed Oct. 7, 2011, now U.S. Pat. No. 8,997,525 issued Apr. 7, 2015; U.S. Ser. No. 13/268,028 filed Oct. 7, 2011, now U.S. Pat. No. 8,875,544 issued Nov. 4, 2014; U.S. Ser. No. 13/268,130 filed Oct. 7, 2011, now U.S. Pat. No. 9,021,838 issued May 5, 2015; U.S. Ser. No. 13/458,211, filed Apr. 27, 2012, now U.S. Pat. No. 9,145,319 issued Sep. 29, 2015; U.S. Ser. No. 13/493,170 filed Jun. 11, 2012, now U.S. Pat. No. 8,707,739 issued Apr. 29, 2014; U.S. Ser. No. 13/493,219 filed Jun. 11, 2012, now U.S. Pat. No. 9,096,453 issued Aug. 4, 2015; U.S. Ser. No. 13/540,771 filed Jul. 3, 2012, now U.S. Pat. No. 9,032,769 issued May 19, 2015; and U.S. Ser. No. 13/268,098 filed Oct. 7, 2011, now U.S. Pat. No. 8,707,740 issued Apr. 29, 2014.

BACKGROUND INFORMATION

Technical Field

The present disclosure relates generally to the field of combustion furnaces and methods of use to produce glass, and more specifically to methods and systems to control bubble size and/or foam decay rate in glass handling equipment downstream of a submerged combustion melter.

Background Art

A submerged combustion melter (SCM) may be employed to melt glass batch materials to produce molten glass by passing oxygen, oxygen-enriched mixtures, or air along with a liquid or gaseous fuel, or particulate fuel in the glass batch, directly into a molten pool of glass usually through burners submerged in a glass melt pool. The introduction of high flow rates of products of combustion of the oxidant and fuel into the molten glass, and the expansion of the gases cause rapid melting of the glass batch and much turbulence, and possibly foaming.

While traditional, non-submerged combustion melters may to a lesser degree suffer from the problems discussed herein (and therefore may benefit from one or more aspects of this disclosure), molten glass produced by an SCM is typically about 30 percent void fraction or more with small bubbles that may have a range of sizes distributed throughout the molten mass of glass. These are referred to herein as "entrained bubbles." This void fraction is much higher than molten glass produced by traditional, non-submerged combustion melters. For good glass fiber production from an SCM or other melter, it is preferred that the bubbles be allowed to coalesce and rise to the surface giving good, clean, well-defined molten glass in lower regions of downstream channels and forehearths to be delivered to a forming operation, such as for continuous e-glass fibers. With regard to SCMs, attempts to reduce the foam through SCM process adjustments, such as use of helium and steam to scavenge and consolidate bubbles, sonic methods to consolidate bubbles, vacuum to increase bubble size, and centrifugal force have not met with complete success in reducing foam from an SCM to an acceptable amount. Certain SCMs and/or flow channels may employ one or more high momentum burners, for example, to impinge on portions of a foam layer. Such methods and burners are disclosed in Applicant's U.S. Pat. No. 9,021,838. Various methods and systems for de-stabilizing the foam layer in equipment downstream of an SCM are proposed in Applicant's U.S. patent application Ser. No. 13/644,058, now U.S. Pat. No. 9,492,831 issued Nov. 15, 2016 (use of low-momentum burners or lancing $H_2$, $O_2$, $N_2$, Ar, and/or air) and in Applicant's U.S. Pat. No. 9,096,452, (vibrate forehearth, impact foam with acoustic waves, impact foam with solids, and/or impact foam with a mechanical apparatus, with or without vibration). On the other hand, for production of foam glass products from an SCM, it may be preferred to maintain the bubbles in their entrained state.

Despite the above efforts, it would be an advance in the glass manufacturing art if foam production in an SCM could be controlled other than by destroying some of the foam after it has formed during melting of glass-forming materials.

SUMMARY

In accordance with the present disclosure, methods and systems are described that surprisingly allow foams produced during submerged combustion melting of glass-forming materials to be controlled in equipment downstream of the SCM by adjustment of alkali oxide content introduced into the SCM, either mixed with the feedstock composition, or introduced separately from the feedstock. While the methods and systems of the present disclosure may also be applicable to non-submerged combustion melters, the highly turbulent molten foamed glass formed in SCMs is a particular target of the methods and systems of the present disclosure.

A first aspect of the disclosure is a method comprising:

(a) feeding a feedstock into a submerged combustion melter (SCM) apparatus, the SCM apparatus comprising a floor, a roof, and a sidewall structure connecting the floor and the roof, the floor and sidewall structure defining an internal space containing a flowing or non-flowing molten mass of foamed glass comprising molten glass and bubbles entrained therein, the molten mass having glass foam comprising glass foam bubbles on at least a portion of a top surface of the molten mass;

(b) routing at least a portion of the molten mass from the SCM apparatus to a downstream apparatus, the molten mass derived at least primarily from the feedstock;

(c) observing stability of the glass foam in the downstream apparatus; and (d) adjusting alkali oxide percentage fed to the SCM apparatus based on the observation to positively or negatively affect the foam stability.

Other aspects of the disclosure include systems for carrying out the above methods, and solid products made using the methods, including foamed glass products. Methods, systems, and products of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
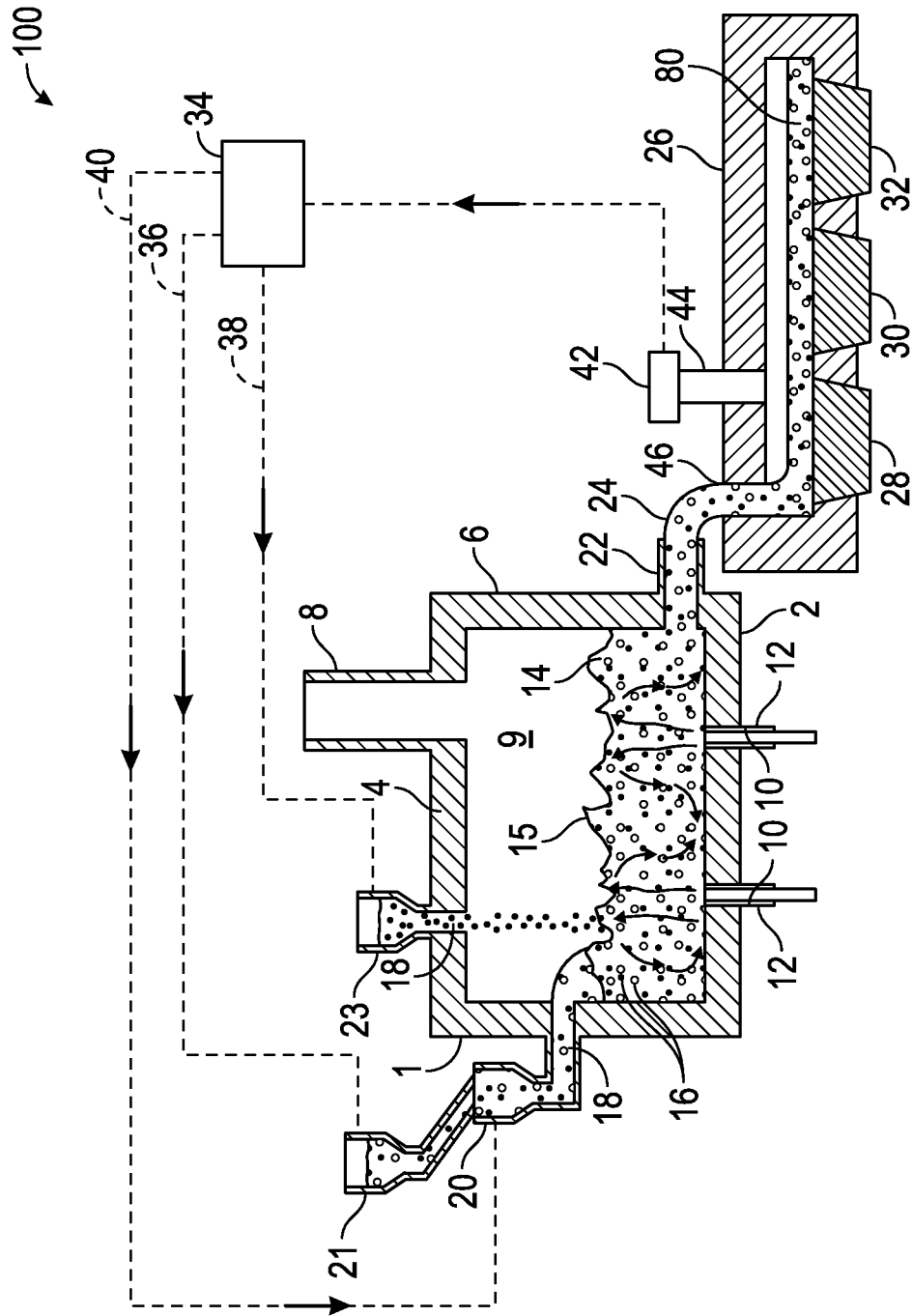
FIG. 1 is a schematic side elevation view, partially in cross-section, of one system embodiment in accordance with the present disclosure.

It is to be noted, however, that the appended drawings may not be to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems, apparatus, and methods. However, it will be understood by those skilled in the art that the systems, apparatus, and methods covered by the claims may be practiced without these details and that numerous variations or modifications from the specifically described embodiments may be possible and are deemed within the claims. For example, wherever the term "comprising" is used, embodiments and/or components where "consisting essentially of" and "consisting of" are explicitly disclosed herein and are part of this disclosure. All patent applications and patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, molten glass produced by an SCM is typically about 30 percent void fraction or more with small bubbles distributed throughout the molten mass of glass, and this void fraction is much higher than molten glass produced by traditional, non-submerged combustion melters. Attempts to reduce the foam through SCM process adjustments, for example to produce good glass or rock wool fibers from an SCM, have not met with complete success in reducing foam from an SCM to an acceptable amount. On the other hand, for production of foam glass products or other foamed products from an SCM, it may be preferred to maintain the bubbles in their entrained state.

The inventors herein have discovered that the size of bubbles collecting at the top surface of the molten glass from a melter (in particular an SCM) forming a foam layer, and the rate at which the bubbles burst upon reaching a clearly discernable glass surface, referred to herein as the "foam decay rate", may be controlled in apparatus downstream of the melter by adjustment of alkali oxide content fed to the melter, or by a combination of temperature adjustment followed by adjustment of alkali oxide content fed to the melter. To produce products having low or no voids, and for good heat penetration from heat sources over the foam and into the molten mass, the foam decay rate is controlled in apparatus downstream of the melter to be as fast as possible. On the other hand, for production of foam products, the foam decay rate in apparatus downstream of the melter is controlled to be slow and the size of the bubbles within the foam may be influenced or controlled. A slower foam decay rate insures production of a foam product, all other parameters being equal, and control of the bubble size within the foam may enable production of foam products of specific strength, insulating properties, and/or density.

Various terms are used throughout this disclosure. "Melter" when used alone includes both traditional, laminar flow melters and highly turbulent SCMs. It will be understood by those skilled in the art, however, that SCMs have drastically different operating parameters than the traditional laminar flow melters. "Submerged" as used herein means that combustion gases emanate from a combustion burner exit that is under the level of the molten glass, and "non-submerged" means that combustion gases do not emanate from combustion burner exits under the level of molten glass, whether in the SCM or downstream apparatus. Both submerged and non-submerged burners may be roof-mounted, floor-mounted, wall-mounted, or any combination thereof (for example, two floor mounted burners and one wall mounted burner). "SC" as used herein means "submerged combustion" unless otherwise specifically noted, and "SCM" means submerged combustion melter unless otherwise specifically noted.

The term "alkali oxide" includes alkali metal oxides and alkaline earth metal oxides, or mixtures thereof, wherein the alkali metal oxides are selected from the group consisting of $M_2O$ (oxides), $M_2O_2$ (peroxides), and $MO_2$ (superoxides), where M is selected from Li, Na, K, Rb, and Cs, and mixtures thereof, and wherein the alkaline earth metal oxides are selected from the group consisting of MO (oxides) and $MO_2$ (peroxides), wherein M is selected from Be, Mg, Ca, Sr, and Ba, or mixtures thereof. Alkali oxides may be used in various forms, including solids (powders or other particle size particulate materials), slurries, mixtures of a gas and solid particles, and the like.

The terms "foam" and "foamy" include froths, spume, suds, heads, fluffs, fizzes, lathers, effervesces, layer and the like. The term "bubble" means a thin, shaped, gas-filled film of molten glass or rock. The shape may be spherical, hemispherical, rectangular, polyhedral, ovoid, and the like. The gas or "bubble atmosphere" in the gas-filled SC bubbles may comprise oxygen or other oxidants, nitrogen, combustion products (including but not limited to, carbon dioxide, carbon monoxide, $NO_x$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like. Bubbles may include solids particles, for example soot particles, either in the film, the gas inside the film, or both. The term "glass foam" means foam where the liquid film comprises molten glass. This term will be used through out, even thought the feedstock may be rock wool feedstock, such as basalt, and the product is rock wool. "Glass level" means the distance measured from the bottom of a downstream apparatus to the upper liquid level of the molten glass or other molten material, and "foam level" means the distance measured from the top of the atmosphere above the foam layer to the upper surface of the foam layer. "Foam height" (equivalent to foam thickness) is the distance measured between the glass level and foam level.

As used herein the term "combustion" means deflagration-type combustion unless other types of combustion are specifically noted, such as detonation-type combustion. Deflagration is sub-sonic combustion that usually propagates through thermal conductivity; hot burning material heats the next layer of cold material and ignites it. Detonation is supersonic and primarily propagates through shock. As used herein the terms "combustion gases" and "combustion products" means substantially gaseous mixtures of combusted fuel, any excess oxidant, and combustion products, such as oxides of carbon (such as carbon monoxide, carbon dioxide), oxides of nitrogen, oxides of sulfur, and water, whether from deflagration, detonation, or combination thereof. Combustion products may include liquids and solids, for example soot and unburned or non-combusted fuels.

"Oxidant" as used herein includes air and gases having the same molar concentrations of oxygen and nitrogen as air (synthetic air), oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof. Some portion of the fuel may comprise a hydrocarbon from a waste stream, such as a waste stream from a hydraulic fracturing operation, or tar sands.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

The term "downstream apparatus" means a container, channel or conduit defined at least by a floor and a wall structure extending upwards from the floor to form a space in which molten material (for example, molten glass, molten rock) may be present, whether flowing or not. In certain embodiments the downstream apparatus will include a roof and a wall structure connecting the floor and roof. The downstream apparatus may have any operable cross-sectional shape (for example, but not limited to, rectangular, oval, circular, trapezoidal, hexagonal, and the like) and any flow path shape (for example, but not limited to, straight, zigzag, curved, and combinations thereof). In certain systems and methods the downstream apparatus may be a flow channel selected from the group consisting of a conditioning channel, a distribution channel, and a forehearth.

Downstream apparatus, as well as conduits used in burners, and devices for delivery of alkali oxides useful in systems and methods of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like. Suitable materials for the glass-contact refractory, which may be present in SC melters and flow channels, and refractory burner blocks (if used), include fused zirconia ($ZrO_2$), fused cast AZS (alumina-zirconia-silica), rebonded AZS, or fused cast alumina ($Al_2O_3$). The particular system and method, downstream apparatus, burner geometry, composition delivery system, and type of glass to be produced may all dictate the choice of a particular material, among other parameters.

Certain submerged and non-submerged combustion burners, certain components in and/or protruding through one or more of the floor, roof, and sidewall structure configured to heat or maintaining temperature of the foamed glass, certain apparatus for delivering an alkali oxide through one or more apertures in the melter sidewall structure and/or the roof for admitting one or more alkali oxides into the melter, and certain portions of the sources of the alkali oxide compositions fluidly connected to the melter useful in systems and methods of this disclosure may be fluid-cooled, and may include first and second (or more) concentric conduits. In the case of burners, the first conduit may be fluidly connected at one end to a source of fuel, the second conduit may be fluidly connected to a source of oxidant, and a third substantially concentric conduit may connect to a source of cooling fluid.

Certain systems of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the roof or the wall structure, or both the roof and wall structure of the downstream apparatus.

In certain systems, one or more burners may be adjustable with respect to direction of flow of the combustion products. Adjustment may be via automatic, semi-automatic, or manual control. Certain system embodiments may comprise a burner mount that mounts the burner in the wall structure, roof, or floor of the downstream apparatus comprising a refractory, or refractory-lined ball joint. Other burner mounts may comprise rails mounted in slots in the wall or roof. In yet other embodiments the burners may be mounted outside of the downstream apparatus, on supports that allow adjustment of the combustion products flow direction. Useable supports include those comprising ball joints, cradles, rails, and the like.

In certain systems and methods of the present disclosure, the downstream apparatus may comprise a flow channel comprising a series of sections, and may comprise one or more skimmers and/or impingement (high momentum) burners, such as described in Applicant's U.S. Pat. Nos. 8,707,739 and 9,021,838. Certain systems and methods of the present disclosure may utilize measurement and control schemes such as described in Applicant's U.S. Pat. No. 9,096,453 and/or feed batch densification systems and methods as described in Applicant's co-pending application U.S. Ser. No. 13/540,704, filed Jul. 3, 2012. Certain systems and methods of the present disclosure may utilize one or more retractable devices for delivery of treating compositions such as disclosed in Applicant's U.S. Pat. No. 8,973,405. Certain systems and methods of the present disclosure may utilize one or more nozzles for delivery of treating compositions such as disclosed in Applicant's U.S. Pat. No. 9,492,831 issued Nov. 15, 2016.

Certain systems and methods of this disclosure may be controlled by one or more controllers. For example, visual observation of foam may be made using one or more video cameras, and/or foam density may be monitored using electromagnetic (EM) sensors. Systems and methods for monitoring glass and glass foam density as a function of vertical position within a vessel are disclosed in assignee's U.S. Pat. No. 9,115,017. As another example, burner (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain systems and methods of this disclosure may also measure and/or monitor feed rate of batch or other feed materials, such as glass batch, cullet, mat or wound roving and treatment compositions, mass of feed, and use these measurements for control purposes. Exemplary systems and methods of the disclosure may comprise a controller which receives one or more input parameters selected from temperature of melt, composition of bubbles and/or foam, height of foam layer, glass level, foam level, and combinations thereof, and may employ a control algorithm to control combustion temperature, flow rate and/or composition of compositions to control foam decay rate and/or glass foam bubble size, and other output parameters based on one or more of these input parameters.

Specific non-limiting system and method embodiments in accordance with the present disclosure will now be presented in conjunction with the attached drawing figures. The same numerals are used for the same or similar features in the various figures. In the views illustrated in the drawing figures, it will be understood in each case that the figures are schematic in nature, and certain conventional features may not be illustrated in all embodiments in order to illustrate more clearly the key features of each embodiment. The geometry of the downstream apparatus is illustrated generally the same in the various embodiments, but that of course is not necessary. Certain systems and methods may be described as comprising an SCM and one or more downstream apparatus receiving flow of molten glass and foam from the SCM, however, other melters may benefit.

FIG. 1 is a schematic side elevation view, partially in cross-section, of one system embodiment 100 in accordance with the present disclosure. An SCM 1 includes a floor 2, a roof or ceiling 4, a sidewall structure 6 connecting the floor 2 and roof 4 and defining an internal space 9, and an exhaust stack 8. The SCM may be constructed of refractory, or refractory lined metal panels, as described in many of assignee's patents mentioned herein. As described in those patents, one or more of floor 2, roof 4, sidewall structure 6, and stack 8 may comprise fluid-cooled panels ("fluid-cooled" is a defined term herein). The SCM may include one or more SC burners, with oxidant flowing through an inner conduit 10 and fuel flowing through an outer concentric conduit 12, or vice versa, or SC burner panels, producing a highly turbulent molten mass 14 having a plurality of bubbles 16 therein. Molten mass 14 has, by virtue of the SC burners or burner panels, a highly turbulent or uneven surface 15. The SCM includes one or more feedstock openings 18 in the sidewall structure and/or roof 4 as illustrated in FIG. 1. The SCM further includes one or more primary feedstock supply containers 20, one or more secondary feedstock supply containers 21, and one or more tertiary feedstock supply containers 23. In embodiment 100, either secondary feedstock supply container 21 feeds primary feedstock supply container 20, as described herein, or tertiary feedstock supply container 23 feeds the SCM directly, or both, controlled by respective signals 40, 36, and/or 38 from a controller 34. SCM also includes one or more melter exit structure 22, where foamy molten mass exits the melter as illustrated at 24 and flows into one or more downstream apparatus 26. In embodiment 100, downstream apparatus 26 includes a channel or forehearth feeding three or more bushings 28, 30, and 32. Bushings are known in the glass and rock wool forming art and require no further explanation herein.

As noted, controller 34 sends signals to feedstock supply containers 20, 21, and/or 23 to supply more or less alkali oxide to the melter. These signals are based solely or primary on readings from one or more foam sensors 42 connected via a conduit 44 or other access port in the downstream apparatus 26. Downstream apparatus 26 includes an opening 46 into which flows foamy molten mass 24 from the SCM or other melter 1. In the downstream apparatus, a foam layer 80 is formed as the foamy molten mass 24 traverses the channel of the downstream apparatus before entering bushings 28, 30, and 32, or other forming component. In the simplest embodiment, as illustrated in FIG. 1, foam sensor 42, which may be a video camera, still camera, or charge-coupled device (CCD), sends a signal 43 to controller 34. Controller 34 may include a programmable logic controller (PLC) or other control device. Conduit 44 may be fluid-cooled, depending on its placement.

The inventors herein have discovered that as little as 0.1 weight percent change in feedstock alkali oxide content may have dramatic affect on certain molten mass' tendency to foam, or maintain foam, in the downstream apparatus. Heretofore, it was thought that the extremely high turbulence in the SCM would prohibit or severely inhibit any attempt to reduce foaming in the downstream apparatus. Although not intending to be bound by any particular theory, it is theorized that alkali oxide content affects the surface tension and/or the viscosity of the molten glass or other material in the film between bubbles of the foam. Surface tension and viscosity tend to hold up the liquid, while gravity tends to draw the liquid downward. It has been our experience that increasing the alkali oxide content, even by small percentages, decreases the ability of the foamy material to support a foam. In certain embodiments, the adjusting alkali oxide percentage comprises adding more or less alkali oxide to the feedstock, but within the bounds of specified molten mass chemistry. In other embodiments, the adjusting alkali oxide percentage comprises adding more or less alkali oxide to the SCM apparatus separate from the feedstock. In certain other embodiments, the adjusting alkali oxide percentage comprises adding more or less alkali oxide to the feedstock during an upset condition, for example, but not limited to, an unexpected power outage, an unexpected increase or decrease in foaming, a problem in the forming apparatus downstream of the downstream apparatus, and the like. In certain embodiments, the adjusting alkali oxide percentage comprises adding no more than about 5.0, or about 4.5, or about 4.0, or about 3.5, or about 3.0, or about 2.5, or about 2.0, or about 1.5, or about 1.0 weight percent alkali oxide or removing less than about 5.0, or about 4.5, or about 4.0, or about 3.5, or about 3.0, or about 2.5, or about 2.0, or about 1.5, or about 1.0 weight percent alkali oxide, where weight percent is measured as a percentage of the total weight of all feedstock to the melter. All values and ranges from about 5.0 to less than about 5.0, such as 4.9, 3.8, 2.7, 1.8, and the like, are expressly disclosed and described herein without limitation. The amount of alkali oxide added may range from a few grams up to a few kilograms per minute. In certain embodiments, the intention is to use a small amount so that the final product chemistry is not affected, but that effectively de-stabilizes or stabilizes the foam as the case may be. The alternative is to formulate the product so that the additional chemical completes the target chemistry.

In certain embodiments of this disclosure, the alkali oxide may be selected from the group consisting of alkali metal oxides and alkaline earth metal oxides, or mixtures thereof, wherein the alkali metal oxides are selected from the group consisting of $M_2O$ (oxides), $M_2O_2$ (peroxides), and $MO_2$ (superoxides), where M is Li, Na, K, Rb, and Cs, and mixtures thereof, and wherein the alkaline earth metal oxides are selected from the group consisting of MO (oxides) and $MO_2$ (peroxides), wherein M is Be, Mg, Ca, Sr, and Ba, or mixtures thereof. In certain embodiments the alkali oxide is $Na_2O$. In the case of hydrated ingredients, both hydrated and non-hydrated forms may be used.

Figure 2:
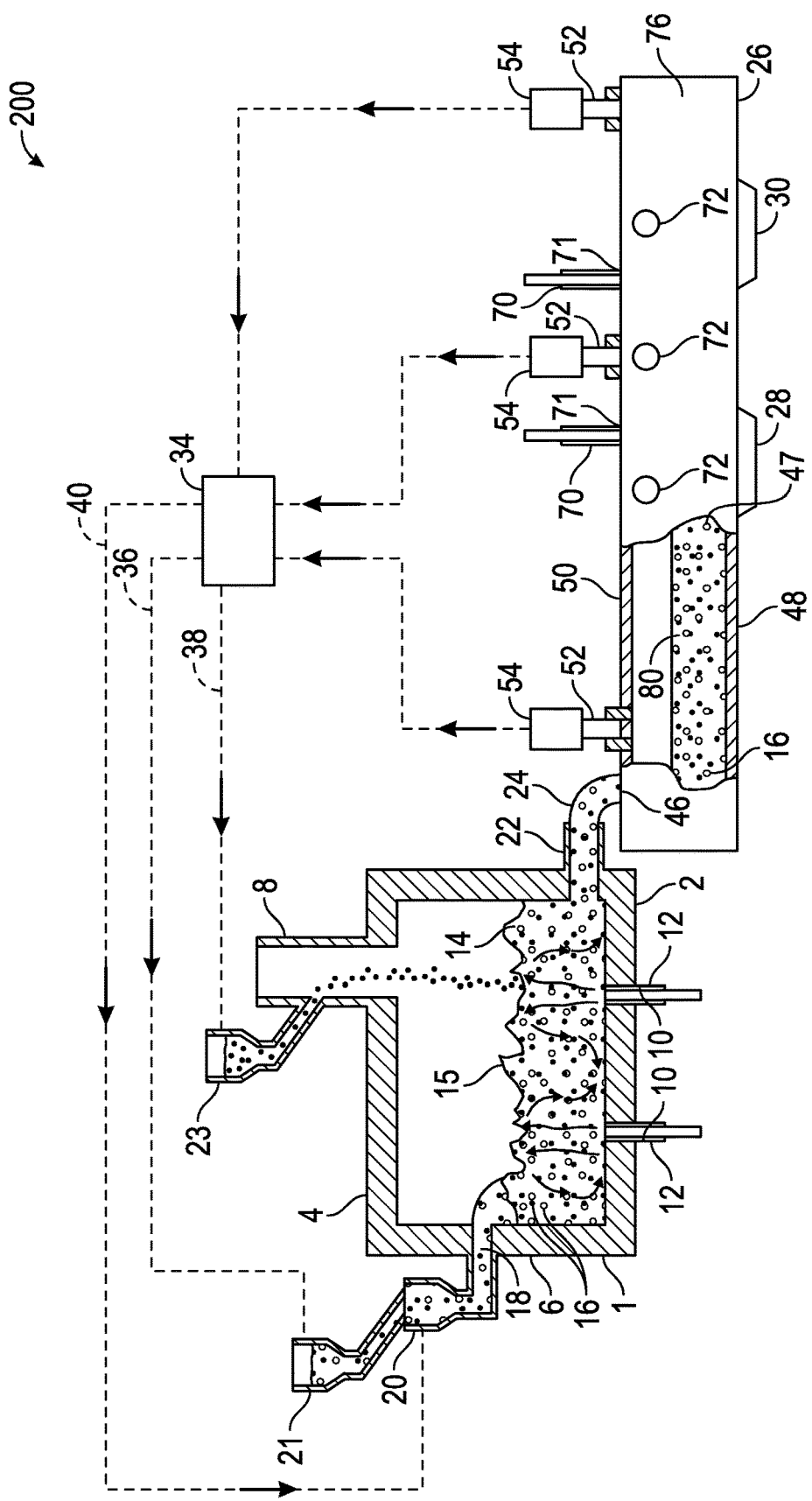
FIG. 2 is a schematic side elevation view, partially in cross-section, of one system embodiment in accordance with the present disclosure.

FIG. 2 illustrates another system and method embodiment 200 within the present disclosure. Embodiment 200 is similar to embodiment 100 illustrated in FIG. 1, differing only in certain details, such as the provision of a downstream apparatus floor 48, roof 50, ports 71 and 72 for non-submerged heating burners 70 having oxidant and fuel conduits. A cut-away portion 47 reveals the foam layer 80 forming inside the downstream apparatus 26. Alternatively, these may be Joule heating elements (electric). Embodiment 200 also includes a plurality of density sensors 54 each connected to the downstream apparatus 26 through its respective conduit 52, which may or may not be fluid-cooled, depending on the metallurgy and temperature they are exposed to. Several methods and systems for monitoring foam density, such as electromagnetic (EM) density sensors, is explained and described in assignee's U.S. Pat. No. 9,115,017. One of the density sensors may positioned near the inlet, one near the center, and one near the distal end 76 of downstream apparatus 26, although these positions are somewhat arbitrary. Another difference is that embodiment 200 may feed some alkali oxide through stack 8, and may take advantage of feedstock preheating; other feedstock streams may also take advantage of feedstock preheating, depending on the particulate size of the feedstock, as explained more fully in assignee's U.S. patent application Ser. No. 14/844,198, filed Sep. 3, 2015.

It should be mentioned here that, although FIGS. 1 and 2 illustrate only "feedback" control, other control designs are possible, such as cascade, feed-forward, and the like, and those are explicitly disclosed herein. For example, a feed-forward control scheme may be employed when it is fairly well known that the alkali oxide content of the feedstock will change, and by how much, over a given operating time period. A cascade control scheme may be provided, for example using a master controller for controlling the amount of alkali oxide provided by one or more of the feedstock supply containers, and a slave controller that senses the melter output and feeds back a signal to the same feedstock supply containers for controlling the amount of feedstock fed to the SCM.

Figure 3:
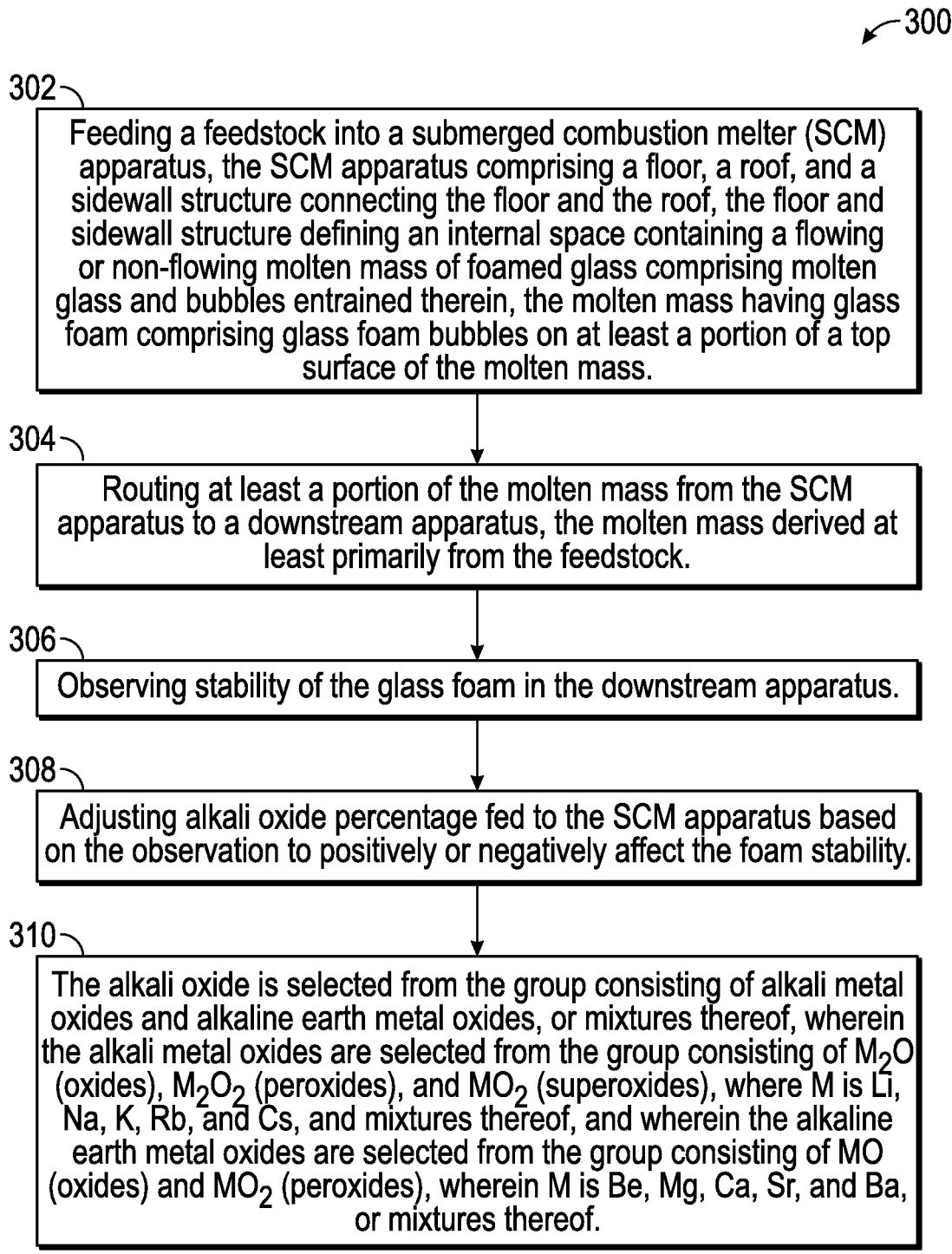
FIGS. 3, 4, and 5 are logic diagrams of three method embodiments of the present disclosure.
Figure 4:
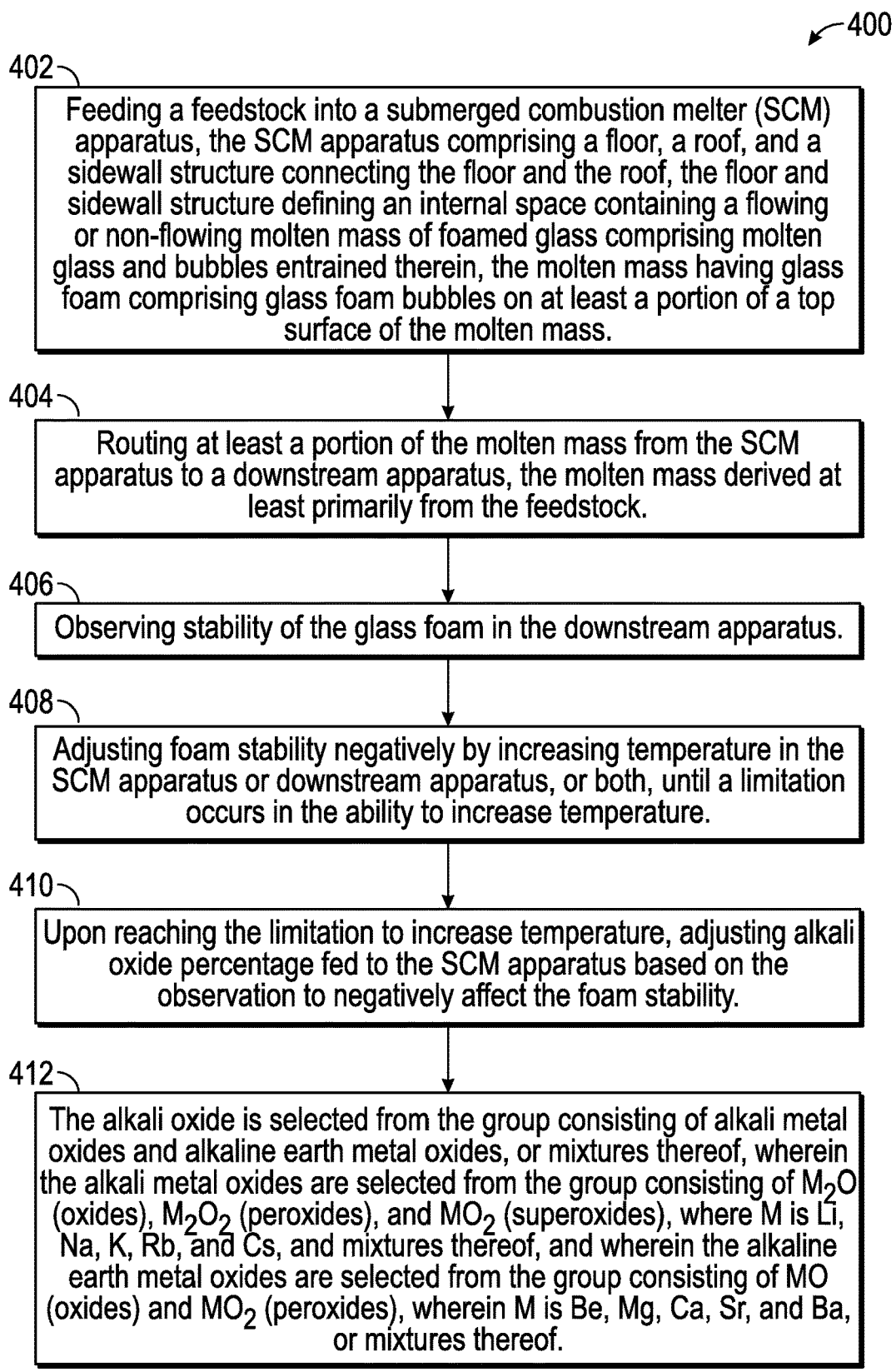
Figure 5:
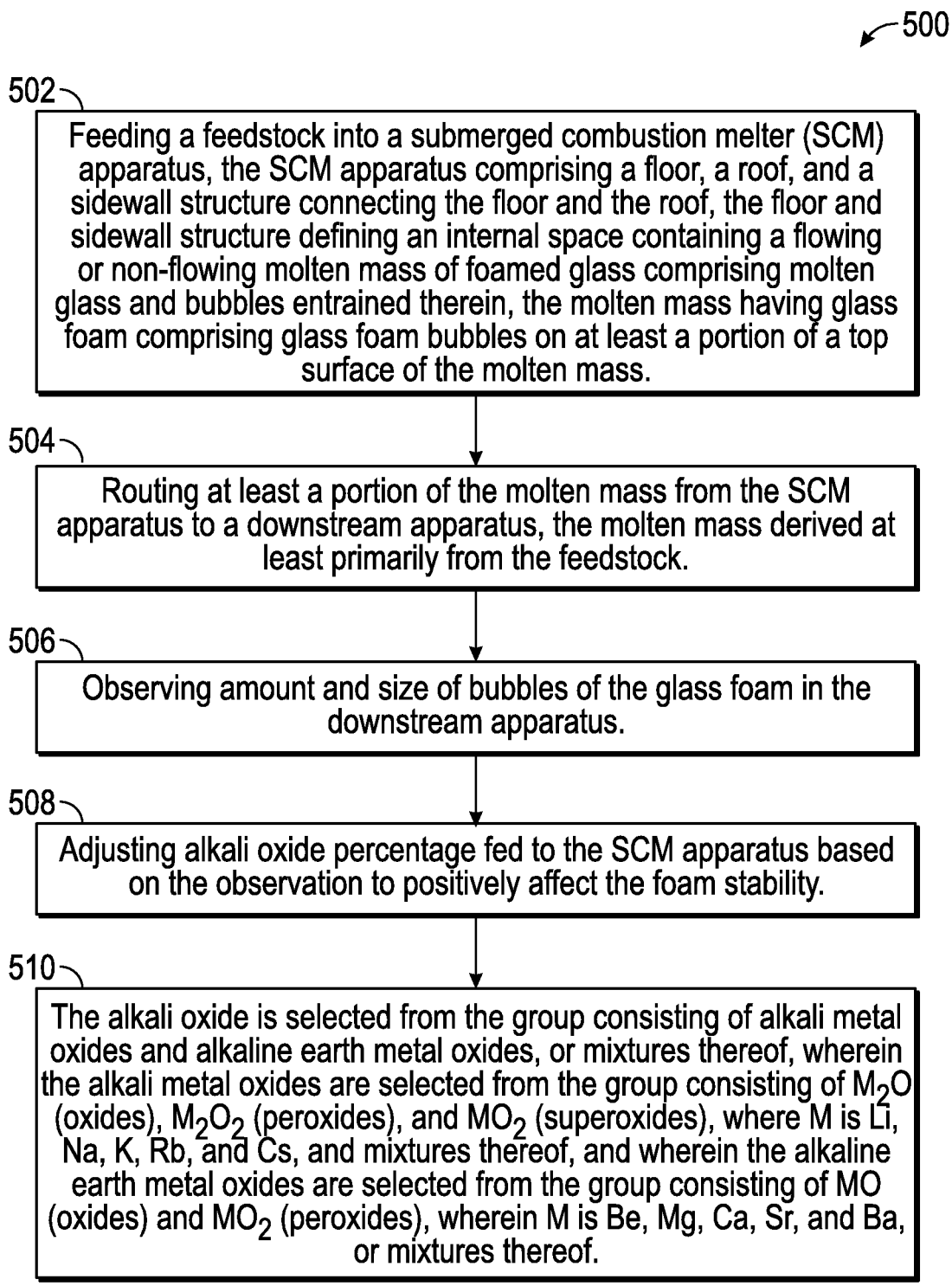

FIGS. 3, 4, and 5 are logic diagrams of three method embodiments of the present disclosure. Method embodiment 300 of FIG. 3 includes the steps of feeding a feedstock into a submerged combustion melter (SCM) apparatus, the SCM apparatus comprising a floor, a roof, and a sidewall structure connecting the floor and the roof, the floor and sidewall structure defining an internal space containing a flowing or non-flowing molten mass of foamed glass comprising molten glass and bubbles entrained therein, the molten mass having glass foam comprising glass foam bubbles on at least a portion of a top surface of the molten mass, box 302. The method further comprises routing at least a portion of the molten mass from the SCM apparatus to a downstream apparatus, the molten mass derived at least primarily from the feedstock, box 304, and observing stability of the glass foam in the downstream apparatus, box 306. The method further comprises adjusting alkali oxide percentage fed to the SCM apparatus based on the observation to positively or negatively affect the foam stability, box 308. The alkali oxide is selected from the group consisting of alkali metal oxides and alkaline earth metal oxides, or mixtures thereof, wherein the alkali metal oxides are selected from the group consisting of $M_2O$ (oxides), $M_2O_2$ (peroxides), and $MO_2$ (superoxides), where M is Li, Na, K, Rb, and Cs, and mixtures thereof, and wherein the alkaline earth metal oxides are selected from the group consisting of MO (oxides) and $MO_2$ (peroxides), wherein M is Be, Mg, Ca, Sr, and Ba, or mixtures thereof, box 310.

Method embodiment 400 of FIG. 4 comprises feeding a feedstock into a submerged combustion melter (SCM) apparatus, the SCM apparatus comprising a floor, a roof, and a sidewall structure connecting the floor and the roof, the floor and sidewall structure defining an internal space containing a flowing or non-flowing molten mass of foamed glass comprising molten glass and bubbles entrained therein, the molten mass having glass foam comprising glass foam bubbles on at least a portion of a top surface of the molten mass, box 402. The method further comprises routing at least a portion of the molten mass from the SCM apparatus to a downstream apparatus, the molten mass derived at least primarily from the feedstock, box 404, observing stability of the glass foam in the downstream apparatus, box 406, and adjusting foam stability negatively by increasing temperature in the SCM apparatus or downstream apparatus, or both, until a limitation occurs in the ability to increase temperature, box 408. The method further comprises upon reaching the limitation to increase temperature, adjusting alkali oxide percentage fed to the SCM apparatus based on the observation to negatively affect the foam stability, box 410. The alkali oxide is selected from the group consisting of alkali metal oxides and alkaline earth metal oxides, or mixtures thereof, wherein the alkali metal oxides are selected from the group consisting of $M_2O$ (oxides), $M_2O_2$ (peroxides), and $MO_2$ (superoxides), where M is Li, Na, K, Rb, and Cs, and mixtures thereof, and wherein the alkaline earth metal oxides are selected from the group consisting of MO (oxides) and $MO_2$ (peroxides), wherein M is Be, Mg, Ca, Sr, and Ba, or mixtures thereof, box 412.

Method embodiment 500 illustrated in FIG. 5 comprises feeding a feedstock into a submerged combustion melter (SCM) apparatus, the SCM apparatus comprising a floor, a roof, and a sidewall structure connecting the floor and the roof, the floor and sidewall structure defining an internal space containing a flowing or non-flowing molten mass of foamed glass comprising molten glass and bubbles entrained therein, the molten mass having glass foam comprising glass foam bubbles on at least a portion of a top surface of the molten mass, box 502. The method further comprises routing at least a portion of the molten mass from the SCM apparatus to a downstream apparatus, the molten mass derived at least primarily from the feedstock, box 504, observing amount and size of bubbles of the glass foam in the downstream apparatus, box 506, and adjusting alkali oxide percentage fed to the SCM apparatus based on the observation to positively affect the foam stability, box 508. The alkali oxide is selected from the group consisting of alkali metal oxides and alkaline earth metal oxides, or mixtures thereof, wherein the alkali metal oxides are selected from the group consisting of $M_2O$ (oxides), $M_2O_2$ (peroxides), and $MO_2$ (superoxides), where M is Li, Na, K, Rb, and Cs, and mixtures thereof, and wherein the alkaline earth metal oxides are selected from the group consisting of MO (oxides) and $MO_2$ (peroxides), wherein M is Be, Mg, Ca, Sr, and Ba, or mixtures thereof, box 510.

SC burners in an SCM produce a turbulent melt comprising bubbles having a bubble atmosphere. In general the atmosphere of the bubbles is about the same from bubble to bubble, but that is not necessarily so. One or more burners in SCM 1 may be oxy-fuel burners. SCM 1 may receive numerous feeds through one or more inlet ports, and batch feeders maybe provided. Other feeds are possible, such as glass mat waste, wound roving, waste materials, and the like, such as disclosed in assignee's U.S. Pat. No. 8,650,914 issued Feb. 18, 2014.

Solids or slurries may be supplied from one or more supply tanks or containers which are fluidly and mechanically connected to the melter via one or more conduits, which may or may not include flow control valves. One or more of the conduits may be flexible metal hoses, but they may also be solid metal, ceramic, or ceramic-lined metal conduits. Any or all of the conduits may include a flow control valve, which may be adjusted to shut off flow through a particular conduit.

In order to determine which alkali oxide may work best for any given situation to stabilize or de-stabilize bubbles in the glass foam may take a small amount of experimentation, but the degree of experimentation is not considered to be extensive or undue. Basically, the foamy molten mass is allowed to enter the downstream apparatus, and the amount of foam or density of the foamy molten mass sensed and that value or values used in one or more control schemes to add or subtract the amount of alkali oxide being fed to the melter to achieve the greatest stabilization or de-stabilization effect on the foam.

In systems and methods employing feedstock supply containers, one or more hoppers containing one or more particles or particulate matter may be provided. One or more hoppers may route particles through roof 4, through sidewall 6, or through both, through various apertures. Hoppers may be positioned in multiple longitudinal and transverse positions in the melter. While it is contemplated that that particulate will flow merely by gravity from the hoppers, and the hoppers need not have a pressure above the solids level, certain embodiments may include a pressurized headspace above the solids in the hoppers. In embodiments, the teachings of assignee's co-pending application U.S. Ser. No. 13/540,704, filed Jul. 3, 2012, describing various screw-feeder embodiments, and teaching of feed material compaction may be useful, although in the present methods and systems loss of batch or other feed material is not the primary concern. In fact, in terms of foam de-stabilization, uncompacted batch or other particulate matter may be preferred. One or more of the hoppers may include shakers or other apparatus common in industry to dislodge overly compacted solids and keep the particles flowing. Furthermore, each hopper will have a valve or other apparatus to stop or adjust flow of particulate matter into the downstream apparatus. These details are not illustrated for sake of brevity.

Certain systems and methods of the present disclosure may be combined with other strategies for foam de-stabilization, if that is the desired end. For example, adding heat to the downstream apparatus may be tried first, before adjustment of alkali oxide content fed to the melter. In certain embodiments, heat is added by burners and/or electrical heating elements until their use is maximized, and then alkali oxide is adjusted. Another strategy may be to add nitrogen as a treating composition to the molten mass of glass and bubbles in the downstream apparatus, which may tend to make bubbles in glass foam 80 less stable when there is the presence of a high moisture atmosphere in the downstream apparatus. A high moisture atmosphere may exist in the downstream apparatus for example when one or more high momentum burners (whether oxy/fuel or not) are used as impingement burners in the downstream apparatus to impinge on glass foam 80. The use of one or more high momentum impingement burners (whether oxy/fuel or not) in a downstream flow channel is described in assignee's U.S. Pat. No. 8,707,739.

Measuring effectiveness of the foam stabilization or de-stabilization systems and methods described herein may generally be made by taking samples of the molten mass of glass and counting bubbles and their size in the molten mass, or a solidified or partially solidified sample thereof, using the naked eye. Another naked eye measurement may simply be comparing an acceptable glass to a glass sample made using a system and method of the present disclosure, and making a naked eye comparison. More sophisticated methods and equipment may certainly be used, such as image analysis using computers to measure size, size distribution and quantity of bubbles (or other parameters) within a high-resolution photograph or micrograph of the material to be analyzed. For example, companies such as Glass Service market methods and equipment for such measurements. The glass melting method, as well as phenomena within the melt, may be continuously observed, recorded and evaluated using a high temperature observation furnace equipped with a special silica observation crucible. This equipment may be further coupled with image analysis equipment to provide easy manipulation of recorded data. For example, in a "melt test", the objective is to evaluate the fining characteristics of differing batch compositions. The area of the recorded images occupied by inhomogeneities (bubbles), bubble size distribution, bubble number, as well as bubble growth rates vs. melting time, may be evaluated to provide comparison between individual batches. The records of the melting course may be provided in the form of video files, which may be displayed on a personal computer, handheld computer, or other viewer. Bubble growth rate, or shrinkage rate, or rate of disappearance measurements may be based on direct observation and recording of bubble sizes depending on time. It is possible to keep bubbles suspended in the melt for hours by the developed "shuttle" method.

In embodiments of the present disclosure, a reduction of 5 percent, or 10 percent, or 20 percent, or 30 percent or more of foam may be acceptable. In other embodiments, nothing short of complete or substantially complete foam or bubble removal will suffice, in other words 90 percent, or 95 percent, or 99 percent, or even 99.9 percent reduction in foam and bubbles.

The downstream apparatus may include one or more bushings for example when producing glass fiber (not illustrated). Downstream apparatus for use in systems and methods of the present disclosure may comprise a roof, floor and sidewall structure comprised of an outer metal shell, non-glass-contact brick or other refractory wall, and glass-contact refractory for those portions expected to be in contact with molten glass. Downstream apparatus may include several sections arranged in series, each section having a roof, floor, and sidewall structure connecting its roof and floor, and defining a flow channel for conditioning molten glass flowing there through. The sections may be divided by a series of skimmers, each extending generally substantially vertically downward a portion of a distance between the roof and floor of the channel, with a final skimmer positioned between a last channel section and a forehearth. The number of sections and the number of skimmers may each be more or less than two. The downstream apparatus may be rectangular as illustrated in the various figures, or may be a shape such as a generally U-shaped or V-shaped channel or trough of refractory material supported by a metallic superstructure.

The flow rate of the molten mass through the downstream apparatus (unless it is a holding container without flow) will depend on many factors, including the geometry and size of the SCM or other melter and downstream apparatus, temperature of the melt, viscosity of the melt, and like parameters, but in general the flow rate of molten mass may range from about 0.5 lb./min to about 5000 lbs./min or more (about 0.23 kg/min to about 2300 kg/min or more), or from about 10 lbs./min to about 500 lbs./min (from about 4.5 kg/min to about 227 kg/min), or from about 100 lbs./min to 300 lbs./min (from about 45 kg/min to about 136 kg/min).

Certain embodiment may use low momentum burners. Low momentum burners useful in systems and methods of this disclosure may include some of the features of those disclosed in assignee's U.S. Pat. No. 9,021,838. For low momentum burners using natural gas as fuel, the burners may have a fuel firing rate ranging from about 0.4 to about 40 scfh (from about 11 L/hr. to about 1,120 L/hr.); an oxygen firing rate ranging from about 0.6 to about 100 scfh (from about 17 L/hr. to about 2,840 L/hr.); a combustion ratio ranging from about 1.5 to about 2.5; nozzle velocity ratio (ratio of velocity of fuel to oxygen at the fuel nozzle tip) ranging from about 0.5 to about 2.5; a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Those of skill in this art will readily understand the need for, and be able to construct suitable fuel supply conduits and oxidant supply conduits, as well as respective flow control valves, threaded fittings, quick connect/disconnect fittings, hose fittings, and the like.

Submerged combustion melters may be fed a variety of feed materials. The initial raw material may include any material suitable for forming molten glass or molten rock, such as, for example, limestone, glass, sand, soda ash, feldspar, basalt, and mixtures thereof. A glass composition for producing glass fibers known as "E-glass" typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's U.S. Publication Nos. 2007/0220922 and 2008/0276652. The initial raw material to provide these glass compositions can be calculated in known manner from the desired concentrations of glass components, molar masses of glass components, chemical formulas of batch components, and the molar masses of the batch components. Typical E-glass batches include those reproduced in Table 1, borrowed from U.S. Publication No. 2007/0220922. Notice that during glass melting, carbon dioxide (from lime) and water (borax) evaporate. The initial raw material can be provided in any form such as, for example, relatively small particles.

TABLE 1

A typical E-glass batch
BATCH COMPOSITION (BY WEIGHT)

| Raw material | Limestone (Baseline) | Quick-lime | Ca Silicate | Volcanic Glass | Ca Silicate & Volcanic Glass | Quartz-free #1 | Quartz-free #2 | Limestone Slag | Ca Silicate Slag | Quartz-free #3 | Quartz and Clay Free | Ca Silicate/ Feldspar |
|---|---|---|---|---|---|---|---|---|---|---|---|---|
| Quartz (flint) | 31.3% | 35.9% | 15.2% | 22.6% | 8.5% | 0% | 0% | 22.3% | 5.7% | 0% | 0% | 19.9% |
| Kaolin Clay | 28.1% | 32.3% | 32.0% | 23.0% | 28.2% | 26.4% | 0% | 22.7% | 26.0% | 26.0% | 0% | 0% |
| BD Lime | 3.4% | 4.3% | 3.9% | 3.3% | 3.8% | 3.7% | 4.3% | 2.8% | 3.1% | 3.1% | 4.3% | 4.4% |
| Borax | 4.7% | 5.2% | 5.2% | 0% | 1.5% | 0% | 0% | 0% | 0% | 0% | 1.1% | 1.1% |
| Boric Acid | 3.2% | 3.9% | 3.6% | 7.3% | 6.9% | 8.2% | 8.6% | 7.3% | 8.2% | 8.2% | 7.7% | 7.8% |
| Salt Cake | 0.2% | 0.2% | 0.2% | 0.2% | 0.2% | 0.2% | 0.2% | 0.2% | 0.2% | 0.2% | 0.2% | 0.2% |
| Limestone | 29.1% | 0% | 0% | 28.7% | 0% | 0% | 0% | 27.9% | 0% | 0% | 0% | 0% |
| Quicklime | 0% | 18.3% | 0% | 0% | 0% | 0% | 0% | 0% | 0% | 0% | 0% | 0% |
| Calcium Silicate | 0% | 0% | 39.9% | 0% | 39.1% | 39.0% | 27.6% | 0% | 37.9% | 37.9% | 26.5% | 26.6% |
| Volcanic Glass | 0% | 0% | 0% | 14.9% | 11.8% | 17.0% | 4.2% | 14.7% | 16.8% | 16.8% | 0% | 0% |
| Diatomaceous Earth (DE) | | | | | | 5.5% | 17.4% | 0% | 0% | 5.7% | 20.0% | 0% |
| Plagioclase Feldspar | | | | | | 0% | 38.3% | 0% | 0% | 0% | 40.1% | 40.1% |
| Slag | | | | | | 0% | 0% | 2.0% | 2.0% | 2.0% | 0% | 0% |
| Total | 100% | 100% | 100% | 100% | 100% | 100% | 100% | 100% | 100% | 100% | 100% | 100% |
| Volume of $CO_2$ @ 1400 C. | 1668 | 0 | 0 | 1647 | 0 | 0 | 0 | 1624 | 0 | 0 | 0 | 0 |

SCMs may also be fed by one or more roll stands, which in turn, supports one or more rolls of glass mat as described in assignee's U.S. Pat. No. 8,650,914. In certain embodiments powered nip rolls may include cutting knives or other cutting components to cut or chop the mat (or roving, in those embodiments processing roving) into smaller length pieces prior to entering the SCM. Also provided in certain embodiments may be a glass batch feeder. Glass batch feeders are well-known in this art and require no further explanation.

One low-cost non-metallic inorganic material being used to make inorganic fibers is basalt rock, sometimes referred to as lava rock. US20120104306 discloses a method for manufacturing basalt filament, comprising the steps of grinding basalt rock as a material, washing a resultant ground rock, melting the ground rock that has been washed, transforming a molten product into fiber, and drawing the fiber in an aligned manner, and winding it. The temperature of the molten product in the melting step is 1400 to 1650° C., and log η is 2.15 to 2.35 dPa·s and more preferably 2.2 to 2.3 dPa·s, where η is the viscosity of the molten product. The size of basalt rock may be on the order of several mm to several dozens of millimeters (mm), or several microns (μm) to several dozens of mm, according to this reference.

Typical examples of basalt that are compositionally stable and available in large quantities are reported in the aforementioned U.S. Patent Publication 20120104306, namely an ore having a larger amount of $SiO_2$ (A, for high-temperature applications) and an ore having a smaller amount of $SiO_2$ (B, for intermediate-temperature applications), both of which have approximately the same amount of Al2O3. Although ore A can be spun into fiber, the resultant basalt fiber has heat-resistance problem at temperature ranges exceeding 750° C. Ore B, on the other hand, is associated with higher energy cost for mass production of fiber. The basalt rock material feedstock for use on the systems and methods of the present disclosure may be selected from: (1) high-temperature ore (A) having substantially the same amount of $Al_2O_3$ and a larger amount of $SiO_2$; (2) intermediate-temperature ore (B) having substantially the same amount of $Al_2O_3$ and a smaller amount $SiO_2$; and (3) a mixture of the high-temperature basalt rock ore (A) and the intermediate-temperature basalt rock ore (B).

Basalt rock (basalt ore) is an igneous rock. According to U.S. Patent Publication 20120104306, major examples of the constituent mineral include: (1) plagioclase: $Na(AlSi_3O_8)$—$Ca(Al_2SiO_8)$; (2) pyroxene: $(Ca, Mg, Fe2+, Fe3+, Al, Ti)_2[(Si,Al)_2O_6]$; and (3) olivine: $(Fe,Mg)_2SiO_4$. Ukrainian products are inexpensive and good-quality.

Tables 2 and 3 (from U.S. Patent Publication 20120104306) show examples of element ratios (wt. %) and the oxide-equivalent composition ratios (wt. %) determined by ICP analysis (using an inductively-coupled plasma spectrometer ICPV-8100 by Shimadzu Corporation) performed on a high-temperature basalt ore (for high-temperature applications), an intermediate-temperature basalt ore (for intermediate-temperature applications), and a glass consisting of 85% high-temperature ore and 15% intermediate-temperature ore.

TABLE 2

|    | Ore (for high-temp.) (wt %) | Ore (for intermediate-temp.) (wt %) | Ore (for high-temp.) 85 wt % Ore (for intermediate-temp.) 15 wt % (wt %) |
|----|-----|-----|-----|
| Si | 23.5~28.8 | 23.5~28.5 | 25.0~28.8 |
| Al | 8.7~9.3 | 8.7~9.3 | 9.0~9.5 |
| Fe | 6.0~6.6 | 6.0~7.1 | 5.7~6.7 |
| Ca | 4.0~4.5 | 5.6~6.1 | 4.2~4.7 |
| Na | 2.1~2.3 | 1.8~2.0 | 2.0~2.3 |
| K  | 1.4~1.8 | 1.2~1.5 | 1.4~1.9 |
| Mg | 0.1~1.6 | 1.4~3.0 | 1.5~1.7 |
| Ti | 0.4~0.6 | 0.5~0.7 | 0.4~0.6 |
| Mn | 0.1~0.2 | 0.1~0.2 | 0.1~0.2 |
| P  | 0.05~0.10 | 0.05~0.09 | 0.07~0.10 |
| B  | 0.02~0.08 | 0.01~0.06 | 0.03~0.10 |
| Ba | 0.03~0.05 | 0.03~0.05 | 0.09 |
| Sr | 0.02~0.04 | 0.02~0.04 | 0.02~0.05 |
| Zr | 0.01~0.04 | 0.01~0.04 | 0.01~0.03 |

TABLE 2-continued

|    | Ore (for high-temp.) (wt %) | Ore (for intermediate-temp.) (wt %) | Ore (for high-temp.) 85 wt % Ore (for intermediate-temp.) 15 wt % (wt %) |
|----|-----|-----|-----|
| Cr | 0.01~0.03 | 0.01~0.03 | 0.01~0.03 |
| S  | 0.01~0.03 | 0.01~0.03 | 0.01~0.03 |

TABLE 3

|    | Ore (for high-temp.) (wt %) | Ore (for intermediate-temp.) (wt %) | Ore (for high-temp.) 85 wt % Ore (for intermediate-temp.) 15 wt % (wt %) |
|----|-----|-----|-----|
| $SiO_2$ | 57.1~61.2 | 54.0~58.2 | 57.7~60.6 |
| $Al_2O_3$ | 16.1~19.2 | 14.9~18.1 | 16.5~18.9 |
| $FeO + Fe_2O_3$ | 8.0~9.7 | 8.1~9.6 | 7.7~9.6 |
| CaO | 5.5~6.8 | 7.5~8.8 | 5.8~7.0 |
| $Na_2O$ | 2.8~3.3 | 2.2~2.9 | 2.6~3.2 |
| $K_2O$ | 1.8~2.1 | 1.4~1.8 | 1.8~2.2 |
| MgO | 0.20~2.5 | 1.4~4.8 | 0.2~2.8 |
| $TiO_2$ | 0.7~1.0 | 0.8~1.1 | 0.1~0.3 |
| MnO | 0.1~0.3 | 0.1~0.3 | 0.1~0.3 |
| $P_2O_5$ | 0.1~0.3 | 0.1~0.3 | 0.1~0.3 |
| $B_2O_3$ | 0.1~0.3 | 0.04~0.20 | 0.04~0.30 |
| BaO | 0.03~0.07 | 0.02~0.06 | 0.03~0.12 |
| SrO | 0.02~0.06 | 0.02~0.07 | 0.01~0.06 |
| $ZrO_2$ | 0.02~0.05 | 0.02~0.05 | 0.01~0.30 |
| $Cr_2O_3$ | 0.01~0.05 | 0.01~0.05 | 0.01~0.04 |
| SO | 0.01~0.03 | 0.01~0.03 | 0.01~0.03 |

Downstream apparatus may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids that may be organic, inorganic, or some combination thereof; for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Certain system and method embodiments may comprise a control scheme. For example, as explained in assignee's U.S. Pat. No. 8,650,914, a master method controller may be configured to provide any number of control logics, including feedback control, feed-forward control, cascade control, and the like. The disclosure is not limited to a single master method controller, as any combination of controllers could be used. The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to one or more foam de-stabilization elements, and/or to local devices associated with foam de-stabilization elements able to accept commands A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems. As mentioned previously, the methods of assignee's U.S. Pat. No. 8,973,400, using the vibrations and oscillations of the melter itself, may prove useful predictive control inputs.

The term "fluid-cooled" means use of a coolant fluid (heat transfer fluid) to transfer heat away from the component in question (such as structural walls of an SCM), either by the fluid traveling through the refractory of the panel, through conduits positioned in or adjacent the refractory of the panel, and the like, and does not include natural heat transfer that may occur by ambient air flowing past the panel, or ambient air merely existing adjacent a panel. For example, portions of the heat transfer substructure nearest the melter, distal portion of feedstock supply conduits, and the like may require fluid cooling. Heat transfer fluids may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids and slurries may be selected from liquids and slurries that may be organic, inorganic, or some combination thereof, for example, water, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons. Certain SCMs and method embodiments of this disclosure may include fluid-cooled panels such as disclosed in assignee's U.S. Pat. No. 8,769,992.

The downstream apparatus floors and sidewall structures may include a glass-contact refractory lining. The glass-contact lining may be 1 centimeter, 2 centimeters, 3 centimeters or more in thickness, however, greater thickness may entail more expense without resultant greater benefit. The refractory lining may be one or multiple layers. Glass-contact refractory used in downstream apparatus described herein may be cast concretes such as disclosed in U.S. Pat. No. 4,323,718. Two cast concrete layers are described in the '718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the downstream apparatus, components that require resistance to high temperatures, such as particle guns, rotating blades and paddles, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the geometry of the downstream apparatus and the foam de-stabilization equipment used, and the type of glass to be produced.

EXAMPLES

Laboratory testing was carried out to evaluate use of varying amounts of alkali oxides to influence the foam decay rate and the size of the bubbles within the glass foam layer of glass compositions produced from an SCM. Two trial conditions were tested, the details of which are detailed herein.

The testing of foam decay in different alkali-containing glasses was done by charging a transparent silica tube with a known amount of unfined molten glass. The unfined molten glass was taken directly from the molter discharge of an SCM where the glass was about 40% voids and similar to the glass expected to be discharged from the metier to a conditioning channel where the foam decay rate is important to promote fining and temperature control. The tube was then stoppered with a glass stopper that included an attachment for a gas purge. The unfined molten glass was purged with different gas compositions, but for these tests, the purge gas had a composition similar to the gas atmosphere produced during oxy-fuel melting in an SCM. After purging with the purge gas having a composition similar to the gas atmosphere produced during oxy-fuel melting in an SCM, the tube was inserted into an oven. The top surface of the glass was observed over time.

Observation of the position of the top surface indicated the degree to which voids in the glass formed foam and the rate the foam dissipated (foam decay).

Two unfined molten glasses of different alkali content, both produced in a submerged combustion melter, were tested in this manner. Test results for a low and high alkali glass are given. The first is for a glass with less than 2% alkali, mostly in the form of sodium oxide, 20 grams of glass, and exposed to 1375° C. in the oven.

Figure 6:
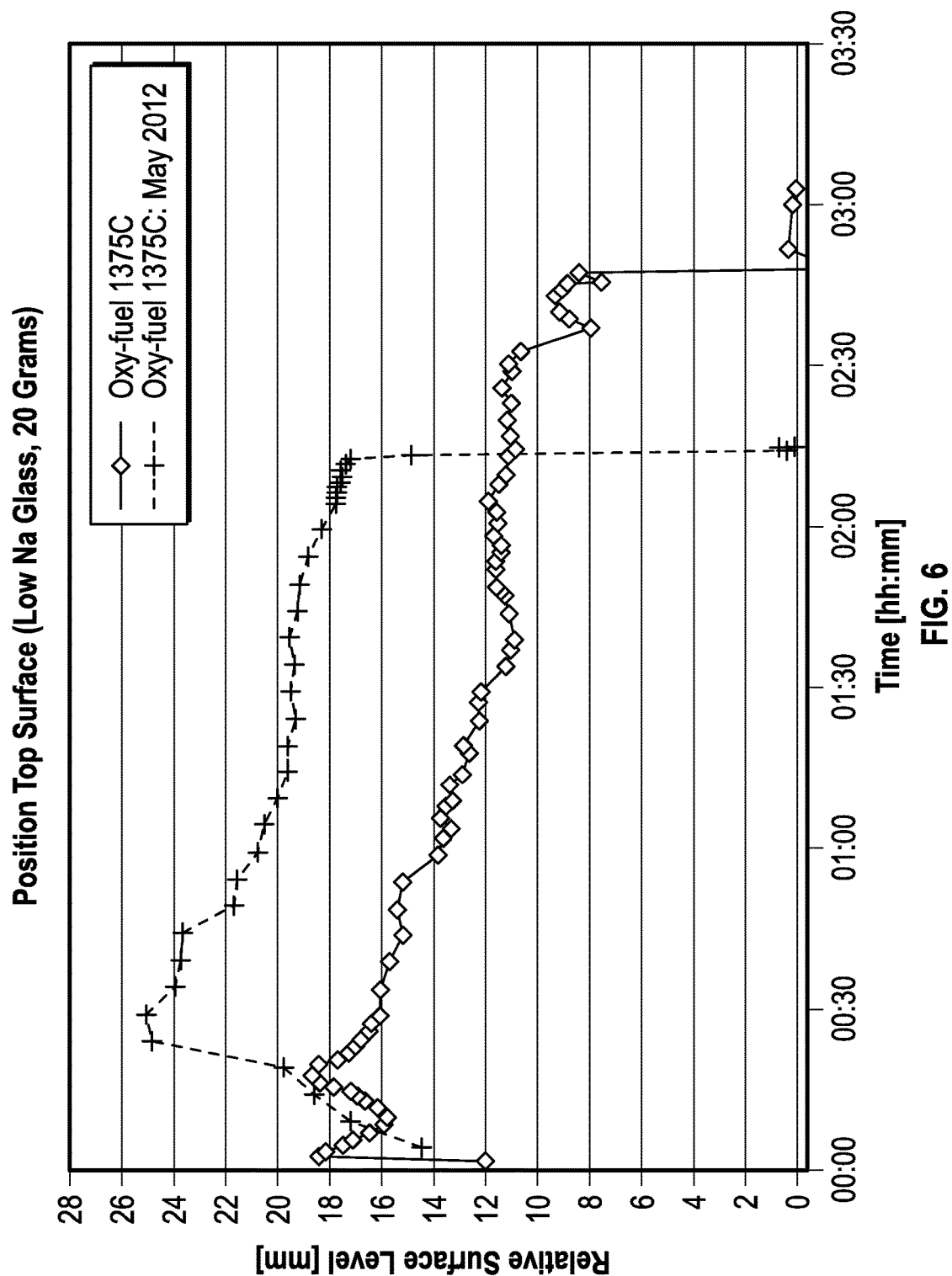
FIGS. 6 and 7 illustrate graphically some experimental results in accordance with the present disclosure.

The results for low alkali oxide glass are illustrated graphically in FIG. 6. The foam height at the maximum was between 18 and 25 cm. The foam decay was quite long, over 2 hours at full temperature exposure.

The second set of tests was for a glass batch with greater than 15% sodium oxide, 40 grams of sample, and exposed to three different temperatures. The lower temperature was selected to test the high alkali glass at a viscosity similar to that of the low alkali glass at 1375° C. The maximum height of foam was similar to that in the first test (18 to 25 cm) but with two to three times more sample and the foam decayed in less than one hour time.

Figure 7:
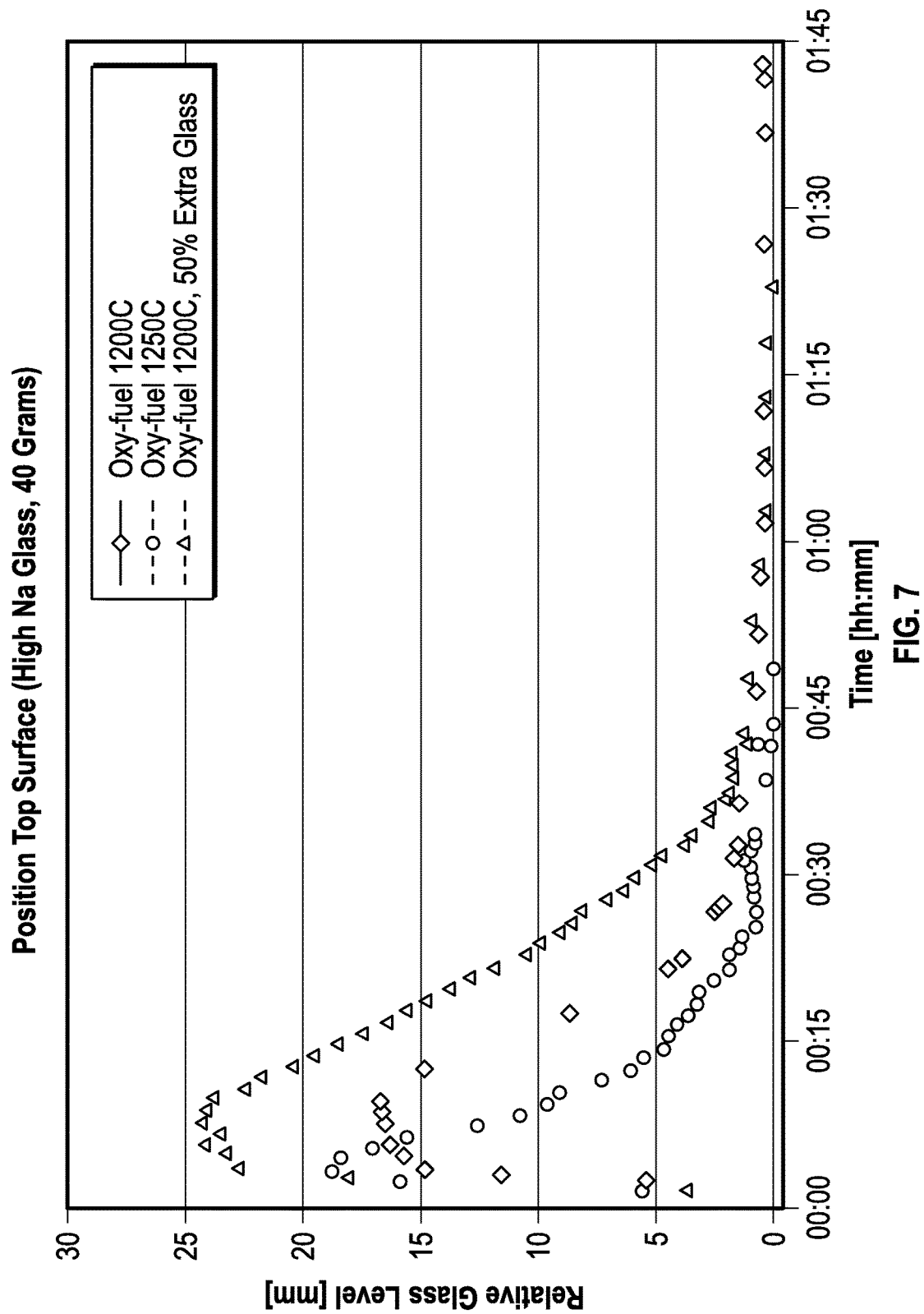

The results for high alkali oxide glass are illustrated graphically in FIG. 7. The high alkali oxide glass had the same amount (height) of foam and the foam decayed in one-half to one-third the time for two to three times more SCM glass. This difference was attributed to the amount of alkali in the glass and supports the claim that the amount of foam and the rate of the foam decay can be influenced or controlled by changes in the glass' alkali content.

Those having ordinary skill in this art will appreciate that there are many possible variations of the systems and methods described herein, and will be able to devise alternatives and improvements to those described herein that are nevertheless considered to be within the claims.

What is claimed is:

1. A method comprising:
   (a) feeding, from one or more feedstock supply containers, one or more initial raw material feedstocks sufficient to produce a molten glass comprising 52-56 weight percent $SiO_2$, the one or more initial raw material feedstocks comprising a known weight percent of a source of alkali oxide (as a percentage of total weight of all initial raw material feedstocks) into a submerged combustion melter (SCM) apparatus at a total feed rate, the SCM apparatus comprising a floor, a roof, and a sidewall structure connecting the floor and the roof, the floor and sidewall structure defining an internal space containing a molten mass of foamed glass comprising the molten glass and bubbles entrained therein, the molten mass having glass foam comprising glass foam bubbles on at least a portion of a top surface of the molten mass;
   (b) routing the molten mass from the SCM apparatus to a downstream fining apparatus;
   (c) observing height of the glass foam in the downstream fining apparatus; and
   (d) increasing or decreasing the percentage of the source of the alkali oxide in one or more of the one or more initial raw material feedstocks fed to the SCM apparatus based on the observation to decrease or increase, respectively, the height of the glass foam in the downstream fining apparatus while also sensing SCM output of the molten mass of foamed glass and feeding back a signal to one or more of the one or more feedstock supply containers, thus controlling the total feed rate of the one or more feedstocks to the SCM;
   (e) wherein the source of the alkali oxide is selected from the group consisting of non-hydrated alkali metal oxides and non-hydrated alkaline earth metal oxides, or mixtures thereof.

2. The method of claim 1 wherein the observing height of the glass foam in the downstream fining apparatus is a visual observation using video camera.

3. The method of claim 1 wherein the increasing or decreasing the percentage of the source of the alkali oxide comprises adding more or less of the source of the alkali oxide to one or more of the one or more initial raw material feedstocks, but within bounds of specified molten mass chemistry.

4. The method of claim 1 wherein the increasing or decreasing the percentage of the source of the alkali oxide comprises adding more or less of the source of the alkali oxide to the SCM apparatus separate from the one or more initial raw material feedstocks.

5. The method of claim 1 wherein the non-hydrated alkali metal oxides are selected from the group consisting of $M_2O$ (oxides), $M_2O_2$ (peroxides), and $MO_2$ (superoxides), where M is selected from the group consisting of Li, Na, K, Rb, and Cs, and mixtures thereof, and wherein the non-hydrated alkaline earth metal oxides are selected from the group consisting of MO (oxides) and $MO_2$ (peroxides), wherein M is selected from the group consisting of Be, Mg, Ca, Sr, and Ba, or mixtures thereof.

6. The method of claim 1 wherein the increasing or decreasing the percentage of the source of the alkali oxide comprises adding more or less of the source of the alkali oxide to one or more of the one or more initial raw material feedstocks during an upset condition.

7. The method of claim 1 wherein the increasing or decreasing the percentage of the source of the alkali oxide in one or more of the one or more initial raw material feedstocks alkali oxide comprises adding no more than 1.0 weight percent of the source of the alkali oxide or removing less than 1.0 weight percent of the source of the alkali oxide, where weight percent is measured as a percentage of the total weight of all feedstock to the melter.

8. A method comprising:
   (a) feeding, from a feedstock supply container, an initial raw material feedstock sufficient to produce a molten glass comprising 52-56 weight percent $SiO_2$, the initial raw material feedstock comprising a known weight percent of a source of alkali oxide (as a percentage of total weight of the initial raw material feedstock) into a submerged combustion melter (SCM) apparatus at a total feed rate, the SCM apparatus comprising a floor, a roof, and a sidewall structure connecting the floor and the roof, the floor and sidewall structure defining an internal space containing a molten mass of foamed glass comprising the molten glass and bubbles entrained therein, the molten mass having glass foam comprising glass foam bubbles on at least a portion of a top surface of the molten mass;
   (b) routing the molten mass from the SCM apparatus to a downstream fining apparatus;
   (c) observing height of the glass foam in the downstream fining apparatus;
   (d) decreasing the height of the glass foam in the downstream fining apparatus by increasing temperature in the SCM apparatus or the downstream fining apparatus, or both, until a limitation occurs in the ability to increase temperature; and
   (e) upon reaching the limitation to increase temperature, increasing the percentage of the source of the alkali oxide in the initial raw material feedstock fed to the SCM apparatus based on the observation to decrease the height of the glass foam while also sensing SCM output of the molten mass of foamed glass and feeding back a signal to the feedstock supply container, thus controlling the total feed rate of the feedstock to the SCM;
   (f) wherein the source of alkali oxide is selected from the group consisting of non-hydrated alkali metal oxides and non-hydrated alkaline earth metal oxides, or mixtures thereof.

9. The method of claim 8 wherein the observing height of the glass foam in the downstream fining apparatus is a visual observation using video camera.

10. The method of claim 8 wherein the increasing the percentage of the source of the alkali oxide in the initial raw material feedstock comprises adding more of the source of alkali oxide to the initial raw material feedstock, but within bounds of specified molten mass chemistry.

11. The method of claim 8 wherein the increasing the percentage of the source of the alkali oxide in the initial raw material feedstock comprises adding more of the source of alkali oxide to the SCM apparatus separate from the initial raw material feedstock.

12. The method of claim 8 wherein the non-hydrated alkali metal oxides are selected from the group consisting of $M_2O$ (oxides), $M_2O_2$ (peroxides), and $MO_2$ (superoxides), where M is selected from the group consisting of Li, Na, K, Rb, and Cs, and mixtures thereof, and wherein the non-hydrated alkaline earth metal oxides are selected from the group consisting of MO (oxides) and $MO_2$ (peroxides), wherein M is selected from the group consisting of Be, Mg, Ca, Sr, and Ba, or mixtures thereof.

13. The method of claim 8 wherein the increasing the percentage of the source of the alkali oxide in the initial raw material feedstock comprises adding more of the source of alkali oxide to the initial raw material feedstock during an upset condition.

14. The method of claim 8 wherein the increasing the percentage of the source of the alkali oxide in the initial raw material feedstock comprises adding no more than 1.0 weight percent of the source of alkali oxide to the initial raw material feedstock, where weight percent is measured as a percentage of the total weight of the initial raw material feedstock to the melter.

15. A method comprising:
    (a) feeding, from a feedstock supply container, an initial raw material feedstock sufficient to produce a molten glass comprising 52-56 weight percent $SiO_2$, the initial raw material feedstock comprising a known weight percent of a source of alkali oxide (as a percentage of total weight of the initial raw material feedstock) into a submerged combustion melter (SCM) apparatus at an initial feed rate, the SCM apparatus comprising a floor, a roof, and a sidewall structure connecting the floor and the roof, the floor and sidewall structure defining an internal space containing a molten mass of foamed glass comprising the molten glass and bubbles entrained therein, the molten mass having glass foam comprising glass foam bubbles on at least a portion of a top surface of the molten mass;
    (b) routing the molten mass from the SCM apparatus to a downstream fining apparatus;
    (c) observing amount and size of bubbles of the glass foam in the downstream fining apparatus; and
    (d) reducing the percentage of the source of alkali oxide in the initial raw material feedstock fed to the SCM apparatus based on the observation to positively affect the foam stability while also sensing SCM output of the molten mass of foamed glass and feeding back a signal to the feedstock supply container, thus controlling the feed rate of the initial raw material feedstock to the SCM;
    (e) wherein the source of alkali oxide is selected from the group consisting of non-hydrated alkali metal oxides and non-hydrated alkaline earth metal oxides, or mixtures thereof.

16. The method of claim 15 wherein the observing the amount and the size of the bubbles of the glass foam in the downstream fining apparatus is a visual observation using video camera.

17. The method of claim 15 wherein the reducing the percentage of the source of the alkali oxide in the initial raw material comprises adding less of the source of alkali oxide to the initial raw material feedstock, but within bounds of specified molten mass chemistry.

18. The method of claim 15 wherein the reducing the percentage of the source of the alkali oxide in the initial raw material comprises adding less of the source of alkali oxide to the SCM apparatus separate from the initial raw material feedstock.

19. The method of claim 15 wherein the non-hydrated alkali metal oxides are selected from the group consisting of $M_2O$ (oxides), $M_2O_2$ (peroxides), and $MO_2$ (superoxides), where M is selected from the group consisting of Li, Na, K, Rb, and Cs, and mixtures thereof, and wherein the non-hydrated alkaline earth metal oxides are selected from the group consisting of MO (oxides) and $MO_2$ (peroxides), wherein M is selected from the group consisting of Be, Mg, Ca, Sr, and Ba, or mixtures thereof.

20. The method of claim 15 wherein the reducing the percentage of the source of the alkali oxide in the initial raw material comprises removing the source of alkali oxide from the initial raw material feedstock during an upset condition.

21. The method of claim 15 wherein the reducing the percentage of the source of the alkali oxide in the initial raw material comprises removing no more than 1.0 weight percent of the source of alkali oxide, where weight percent is measured as a percentage of the total weight of the initial raw material feedstock to the melter.

\* \* \* \* \*